United States Patent
Baggot et al.

(10) Patent No.: US 10,856,694 B1
(45) Date of Patent: Dec. 8, 2020

(54) INDOOR/OUTDOOR HOT CABINET

(71) Applicant: Crescent Metal Products, Inc., Mentor, OH (US)

(72) Inventors: Cliff D. Baggot, Gates Mills, OH (US); John E. Eads, Chardon, OH (US); Chad Fisher, Thompson, OH (US); Lawrence F. Gage, Seven Hills, OH (US); Jerry Hanratty, Willowick, OH (US); Elias David Vuicich, Mentor, OH (US)

(73) Assignee: Crescent Metal Products, Inc., Mentor, OH (US)

( * ) Notice: Subject to any disclaimer, the term of this patent is extended or adjusted under 35 U.S.C. 154(b) by 0 days.

(21) Appl. No.: 16/676,854

(22) Filed: Nov. 7, 2019

Related U.S. Application Data

(63) Continuation of application No. 13/628,539, filed on Sep. 27, 2012, now abandoned.

(60) Provisional application No. 61/539,741, filed on Sep. 27, 2011.

(51) Int. Cl.
*A47J 39/00* (2006.01)
*F24C 1/02* (2006.01)

(52) U.S. Cl.
CPC .................. *A47J 39/00* (2013.01); *F24C 1/02* (2013.01)

(58) Field of Classification Search
CPC ..................................... F24C 1/02; A47J 39/00
See application file for complete search history.

(56) References Cited

U.S. PATENT DOCUMENTS

| | | |
|---|---|---|
| 1,370,517 A | 3/1921 | Cheeseman |
| 1,815,088 A | 7/1931 | William |
| 2,222,065 A | 11/1940 | Blakeslee |
| 2,463,712 A | 3/1949 | Newell |
| 3,396,717 A | 8/1968 | Winkler |
| 3,423,568 A | 1/1969 | Vonderhaar |
| 3,515,119 A | 6/1970 | Kivela |
| 3,614,923 A | 10/1971 | Thompson |
| 4,823,766 A | 4/1989 | Violi |
| 5,193,522 A | 3/1993 | Damsteegt |
| 5,240,320 A | 8/1993 | Yerman |
| 5,275,147 A | 1/1994 | Aktinson |
| 5,282,739 A | 2/1994 | Chinsky |
| 5,369,255 A | 11/1994 | Sherer |
| 5,524,610 A | 6/1996 | Clark |
| 5,572,984 A | 11/1996 | Alden et al. |
| 5,617,840 A | 4/1997 | Clifford |
| 5,676,043 A | 10/1997 | Best |
| 5,732,614 A | 3/1998 | Oslin |
| 5,813,394 A | 9/1998 | Clifford |
| 5,960,560 A | 10/1999 | Stoll |

(Continued)

OTHER PUBLICATIONS

Heatlie Hot Box, available Nov. 22, 2010 retrieved online at https://web.archive.org/web/20101024104559/http://heatlie.com.au/products/hotbox on Nov. 6, 2019.

*Primary Examiner* — Avinash A Savani
*Assistant Examiner* — Deepak A Deean
(74) *Attorney, Agent, or Firm* — Renner, Otto, Boisselle & Sklar, LLP

(57) ABSTRACT

An indoor/outdoor cabinet operable by multiple power sources that includes an internal cavity that may be maintained at a desired temperature by a first power source when the cabinet is being used indoors and may be maintained at a desired temperature by a second power source when the cabinet is being used outdoors without the need for an externally located generator or gas supply.

19 Claims, 16 Drawing Sheets

(56) References Cited

U.S. PATENT DOCUMENTS

| | | |
|---|---|---|
| 6,021,642 A | 2/2000 | Guinn |
| 6,050,177 A | 4/2000 | Lassig, Jr. |
| 6,222,163 B1 | 4/2001 | Arntz |
| 6,293,272 B1 | 9/2001 | Harneit |
| 6,640,800 B1 | 11/2003 | Hodgson et al. |
| 6,914,221 B1 | 7/2005 | Witt |
| 6,943,324 B2 | 9/2005 | Ahuja |
| 7,420,140 B2 | 9/2008 | Lenhart, Jr. |
| 7,832,390 B2 | 11/2010 | Hsu et al. |
| 8,563,901 B2 | 10/2013 | Hitchcock |
| 2006/0032491 A1 | 2/2006 | Olson |
| 2006/0090741 A1 | 5/2006 | Bowles |
| 2006/0174863 A1 | 8/2006 | Menegon |
| 2007/0028912 A1 | 2/2007 | Gagas |
| 2007/0210064 A1 | 9/2007 | Quella |
| 2009/0249963 A1 | 10/2009 | Linskens |
| 2010/0132691 A1 | 6/2010 | Leidig |
| 2011/0290781 A1 | 12/2011 | Burt |
| 2012/0234308 A1 | 9/2012 | Faulk |

INDOOR/OUTDOOR HOT CABINET

RELATED APPLICATIONS

This application is a continuation of U.S. application Ser. No. 13/628,539 filed Sep. 27, 2012, which claims the benefit of U.S. Provisional Application No. 61/539,741 filed Sep. 27, 2011, all of which are hereby incorporated herein by reference in their entireties.

FIELD OF INVENTION

The present invention relates generally to hot cabinets, and more particularly, to hybrid indoor/outdoor hot cabinets.

BACKGROUND

In the food vending industry, food warming containers are commonly used for maintaining perishable foods at desired temperatures for periods of time. For example, in vending stands at sports stadiums and arenas food warming containers are used to maintain perishables such as hot dogs in a predetermined temperature range for a period of time. Additionally, food warming containers can also be used as mobile oven units, for maintaining the temperature of perishable foods, during transport, for significant periods of time.

SUMMARY OF INVENTION

The present invention provides an indoor/outdoor cabinet operable by multiple power sources that includes an internal cavity that may be maintained at a desired temperature by a first power source when the cabinet is being used indoors and may be maintained at a desired temperature by a second power source when the cabinet is being used outdoors without the need for an externally located generator or gas supply.

According to one aspect of the invention, an indoor/outdoor cabinet operable by electricity or gas is provided. The cabinet includes a housing defining an internal cavity and having an opening at a front side thereof, a door coupled to the housing for closing the opening and allowing access to the internal cavity, a burner assembly at least partially disposed in the cavity, the burner assembly configured to be powered by a gas supply to heat the cavity, an electrical heating element at least partially disposed in the cavity, the electrical heating element configured to be powered by an electricity supply to heat the cavity, and a control device having a heat source switch coupled to the burner assembly and the electrical heating element for selecting one of the burner assembly or electrical heating element for heating the cavity.

In an embodiment, the control device includes an adjustment device for adjusting a flame of the burner.

In another embodiment the burner assembly includes a burner and an igniter coupled to the adjustment device, wherein the burner may be ignited by a first action of the adjustment device and the flame may be adjusted by a second action of the adjustment device.

In yet another embodiment, the cabinet further comprises a gas valve for regulating a supply of gas to the cavity.

In still another embodiment, the cabinet further comprises a sensor coupled to the gas valve, the sensor configured to determine if a flame of the burner has been extinguished and to send a signal to the gas valve to shut off the supply of gas if the flame has been extinguished.

In a further embodiment, the cabinet further comprises a battery and a solar panel electrically coupled to the battery, wherein the solar panel is configured to power the control device and/or charge the battery.

According to another aspect of the invention, an outdoor cabinet operable by gas is provided. The cabinet includes a housing defining an internal cavity and having an opening at a front side thereof, a door coupled to the housing for closing the opening and allowing access to the internal cavity, a burner assembly at least partially disposed in the cavity and configured to be powered by a gas supply to heat the cavity, and a burner knob for adjusting a flame of the burner assembly, wherein the burner assembly including a burner and an igniter coupled to the burner knob, and wherein the burner may be ignited by a first action of the burner knob and the flame may be adjusted by a second action of the burner knob.

In an embodiment, the cabinet further comprises a gas valve for regulating a supply of gas to the cavity.

In another embodiment, the cabinet further comprises a sensor coupled to the gas valve, the sensor configured to determine if a flame of the burner has been extinguished and to send a signal to the gas valve to shut off the supply of gas if the flame has been extinguished.

The foregoing and other features of the invention are hereinafter described in greater detail with reference to the accompanying drawings.

DETAILED DESCRIPTION

Figure 1:
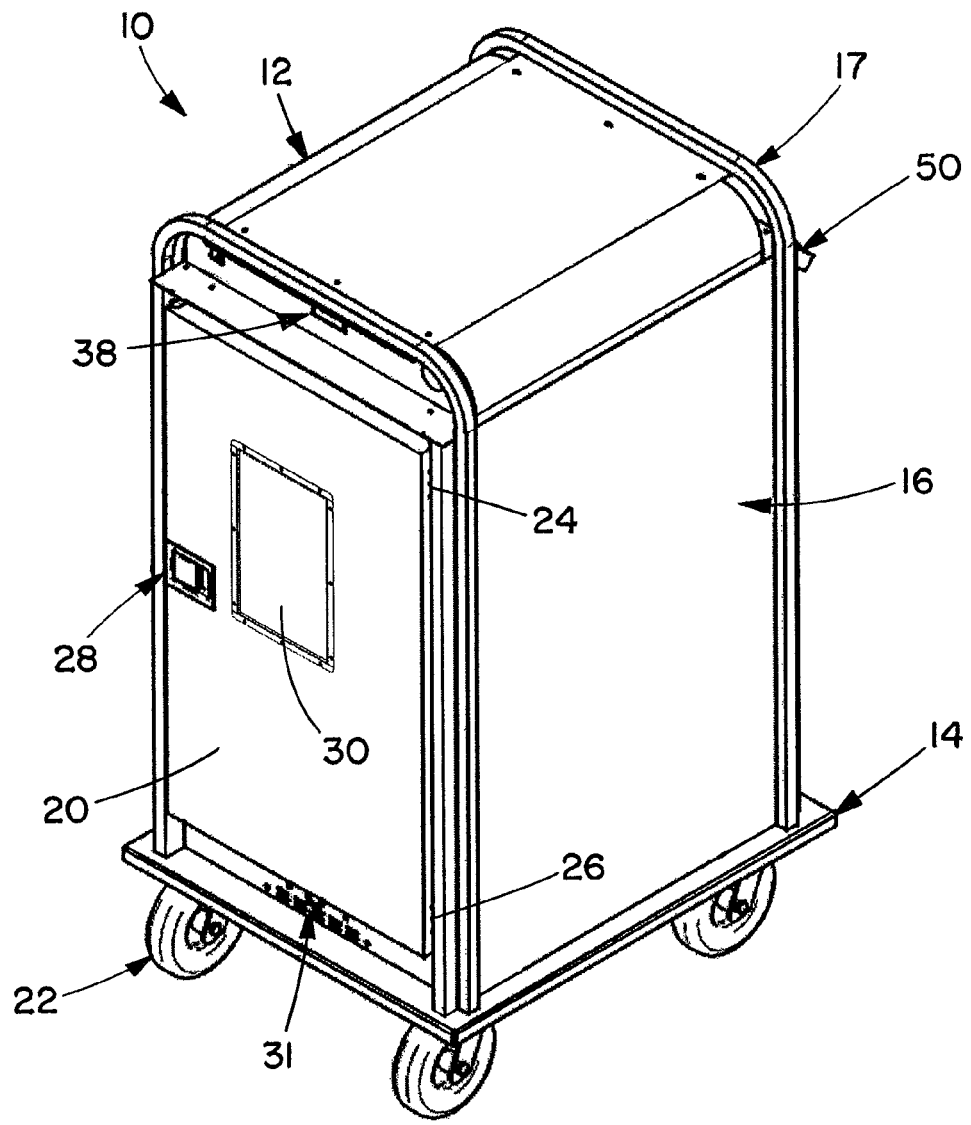
FIG. 1 is a perspective view of an exemplary indoor/outdoor hot cabinet.

Referring now to the drawings in detail, and initially to FIG. 1, illustrated is an exemplary indoor/outdoor hot cabinet 10 that can be powered by electricity or gas, such as propane, natural gas, etc. The cabinets heating system, which may be a 1500 Watt heating system capable of heating up to any desired temperature, such as 200° F., can be powered indoors by plugging the cabinet into a 110 volt outlet, and powered outdoors by the gas, providing a more portable cabinet. It will be appreciated that the cabinet can also be powered outdoors by plugging the cabinet into an electrical outlet or a gas generator, but using electricity reduces the portability of the cabinet.

The cabinet includes a housing 12 formed by a base 14 and a body 16, which may be composed of one or more parts. The housing may be reinforced by a frame, such as an internal stainless steel frame, and may be made of any suitable material, such as aluminum. The housing may include a perimeter bumper, which may be formed around the base for example, that helps prevent damage to the cabinet when it comes in contact with walls, doorframes, etc. A handle 17 may be provided at a top portion of the housing for a user to hold onto to push/pull the cabinet. The housing 12 defines a cavity 18 (FIG. 5) that is accessible by a door 20 that closes an opening in the front of the housing 12. The housing and the door 20 may be insulated to prevent temperature loss during use. For example, the housing may include fiberglass insulation and the door may include a gasket such as a magnetic santoprene.

The door is coupled to the housing 12 by any suitable means, such as by hinges 24 and 26. The door includes a handle 28 configured to latch to the housing by a suitable latch, such as a magnetic latch. In the illustrated embodiment the door is shown having the hinges attached to the right side but it will be appreciated that the door may be field reversible allowing the door to be hinged on the left side. The handle 28 can be equipped with a key lock or other suitable lock to lock the cabinet, for example during transportation. The door 20 may also include a viewing window 30, which may be made of any suitable material, such as glass, acrylic glass, etc. The cabinet may also include a sight panel 31 provided below the door to allow a user to view a burner assembly, discussed below, during use of the cabinet.

Attached to housing 12, for example at a bottom side of the base 14, is a plurality of wheels 22, such as pneumatic swivel casters, that allow the cabinet to be moved easily, even when fully loaded and when tough outdoor conditions are experienced. A brake may be provided on one or more of the casters so that the cabinet can be locked in place when being used.

Figure 5:
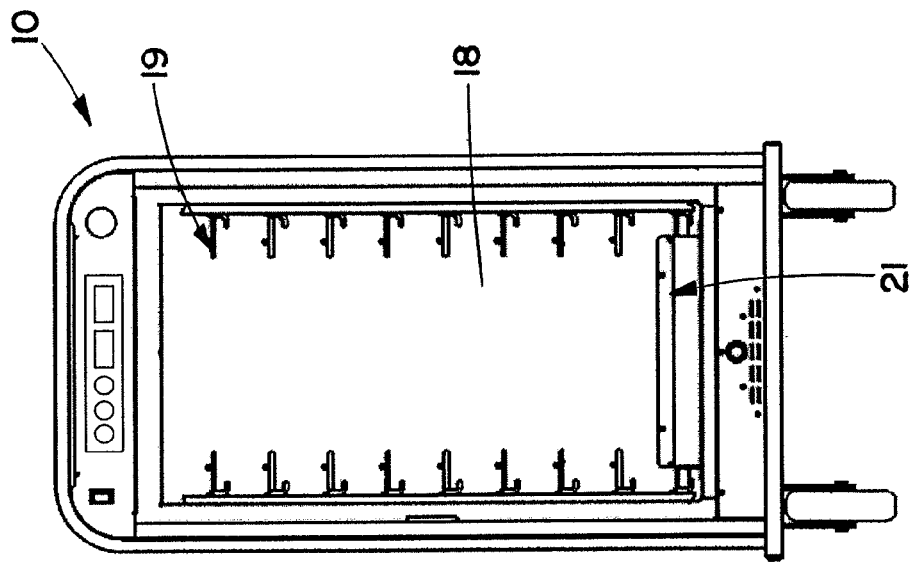
FIG. 5 is a front view of the indoor/outdoor cabinet with a door removed.

As shown in FIG. 5, the cabinet may also include one or more angles 19 provided in the cavity 18 for supporting one or more shelves and/or trays during transportation and use of the cabinet. The angles 19 can be adjusted so that the shelves and/or trays can be configured in any suitable manner. The angles 19 and shelves/trays are removable to allow the cavity to be cleaned. The angles 19 may be chrome plated wire universal angles that are mounted on lift-off pots and that allow for a large variety of pan sizes to be accommodated in the cavity. The cavity 18 also includes smooth interior coved corners to prevent food particle and grease buildup. Also provided in the cavity is heater cover 21 provided to protect an electric heating element 118 (FIG. 11) from damage, food debris, etc.

Figure 2:
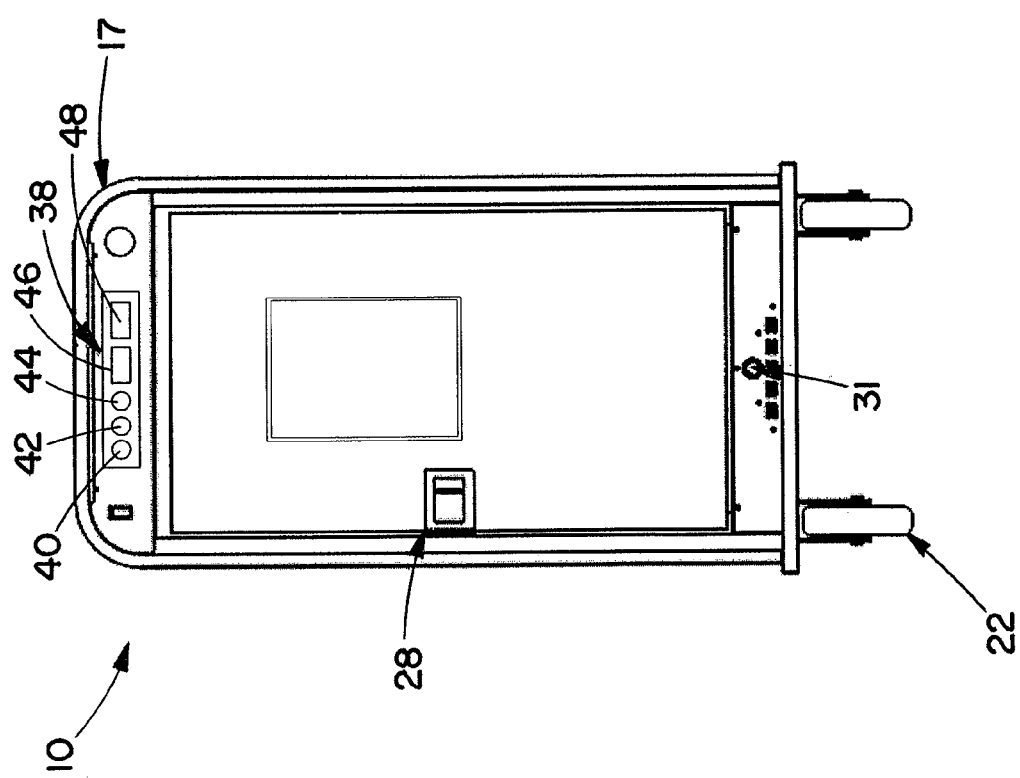
FIG. 2 is a front view of the indoor/outdoor cabinet.

Turning now to FIG. 2, a control panel 38 provided on the front of the cabinet is shown. The control panel is shown above the door 20 but may be included at any suitable location on the cabinet. The control panel may include any suitable control device for operating the cabinet. For example, the control panel may include an on/off switch 40 for turning the cabinet on or off and a heat source switch 42 that may be used to switch the cabinet from one power source to another. The on/off switch may light up to indicate that a burner or electric heating element is on or may be accompanied by an indicator light to indicate that the burner or electric heating element is on. The control panel may also include a thermostat 44, such as a digital thermostat, for adjusting the temperature inside the cabinet, an ignition button 46 for igniting a burner when gas is used, and a reset lamp 48 that that can be lit up when a signal is received from a pressure switch 47 (FIG. 10) that the flame of a burner has gone out. Additionally or alternatively, the control device may include a burner knob that adjusts the temperature in the cavity of the cabinet and/or ignites the burner. The burner knob may be adjustable to various temperatures or to various settings such as low, medium and high. A first action of the burner knob, such as pushing in and/or turning the burner knob, may serve to ignite the burner and may replace the ignition button 46, and a second action of the knob, such as turning the knob clockwise/counter-clockwise, may serve to adjust the temperature setting.

The pressure switch 47 may be configured to send the signal after an igniter 110 (FIG. 8) has attempted to automatically reignite the burner. For example, the igniter will attempt to reignite the burner for a predetermined time, such as ten seconds, and if the burner does not reignite after the predetermined time, a gas valve 84 (FIG. 6) will shut off the supply of gas to the burner. A valve control module 94 (FIG. 6) then communicates to the pressure switch 47, or alternatively directly with the reset lamp 48, to warn the operator that the burner has gone out. Additionally or alternatively, an audible warning can be provided to the operator that the burner has gone out.

In one embodiment the control panel may include a touch screen and display that may replace one or more of the above components, such as by displaying the power source being used, temperature inside the cabinet, time of day, etc. Additionally or alternatively, it will be appreciated that one or more of the controls may be located at other locations on the cabinet. It will also be appreciated that one or more of the components may be operated by hand or may be operated by a remote control.

Figure 3:
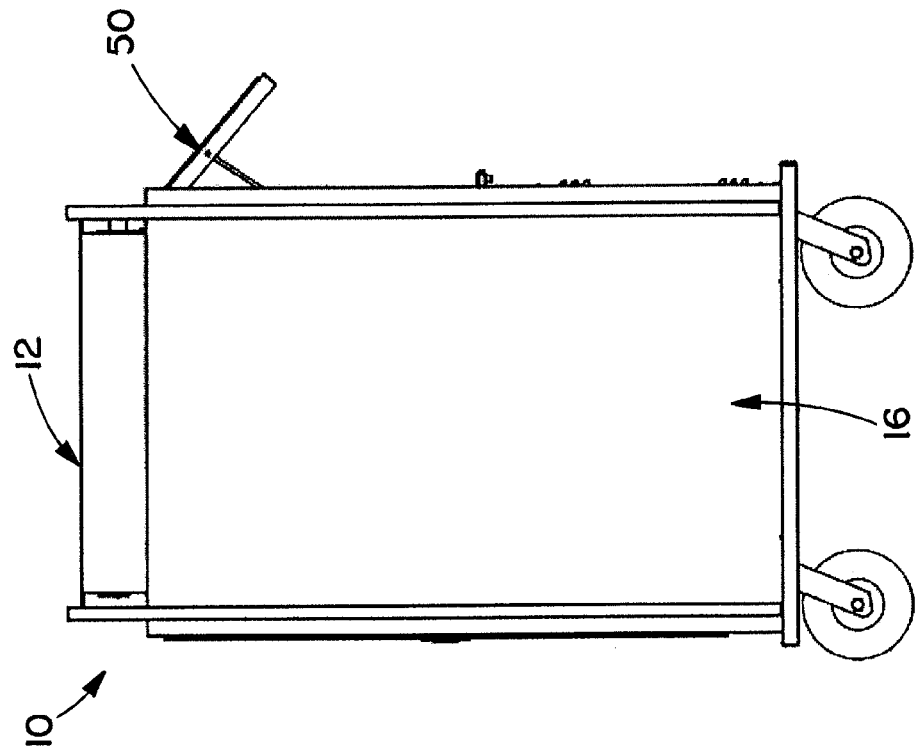
FIG. 3 is a right side view of the indoor/outdoor cabinet.
Figure 4:
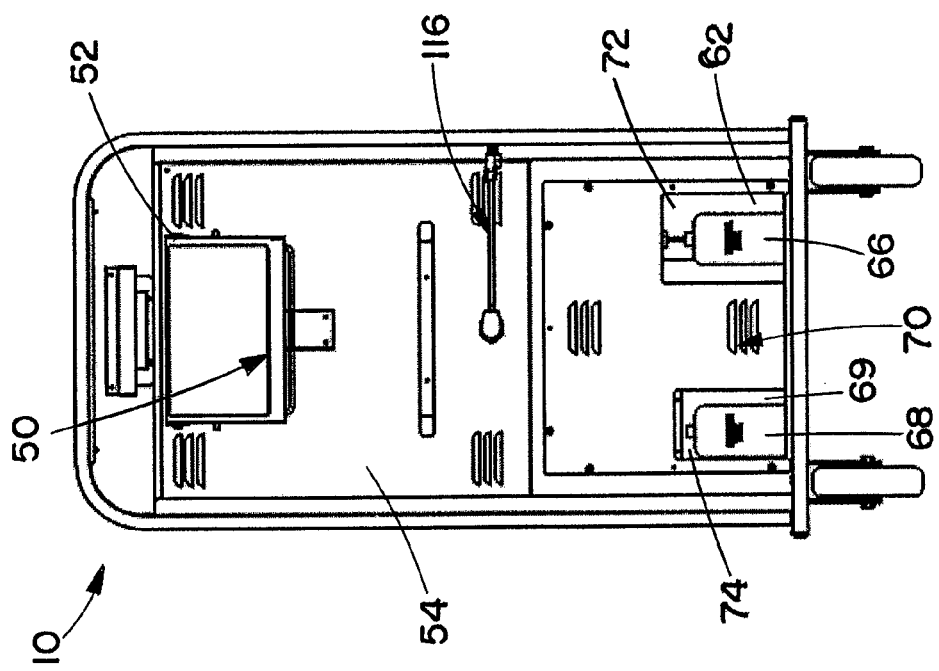
FIG. 4 is a rear view of the indoor/outdoor cabinet.

Turning now to FIG. 4, the back of the cabinet is shown in detail. Attached to the back of the cabinet is a solar panel 50, provided to power to the control panel 38 or other components of the cabinet, either directly or indirectly through a battery 56 (FIG. 6) disposed in the cabinet. The solar panel can be conventional in the art and its manufacture and fabrication is well known. The solar panel can be attached to the cabinet by a hinge 52, or plurality of hinges, to allow the solar panel to be adjusted to receive an optimum amount of sunlight, for example as shown in FIG. 3. The hinge also allows the solar panel to be moved to a stored position in an upper recessed area 54 in the back of the cabinet to prevent the solar panel from being damaged during transportation or when stored and to allow the cabinet to be stored in smaller areas.

The back of the cabinet also includes a lower recessed area 60 (FIG. 6) that has first and second storage wells 62 and 64 for storing tanks, such a gas tanks 66 and 68 that may be any suitable size, such as one pound gas tanks. In the illustrated embodiment, tank 66 is used to power the cabinet and tank 68 is provided as a reserve tank. When tank 66 has been depleted, tank 68 can be moved to storage well 62 and heating can resume. Alternatively, the tank 68 may also be provided to power the cabinet, and accordingly coupled to a regulator as discussed below.

The recessed area 60 may be closed by a plate 70 that may be secured to the housing by a suitable fastener. The plate 70 may be removed to allow access to the recessed area and specifically to the gas tanks 66 and 68. In the illustrated embodiment, the plate 70 includes first and second openings 72 and 74 that allow access to the tanks 66 and 68 so the tanks can be inserted into the recessed area 60 and opened/closed without having to remove the plate 70. The openings 72 and 74 also provide access for an auxiliary hose to be connected to the cabinet so that an externally located gas tank, such as a tank that is larger in size than tanks 66 and 68, can be used to provide power for a longer duration than tanks 66 and 68 can provide.

Figure 6:
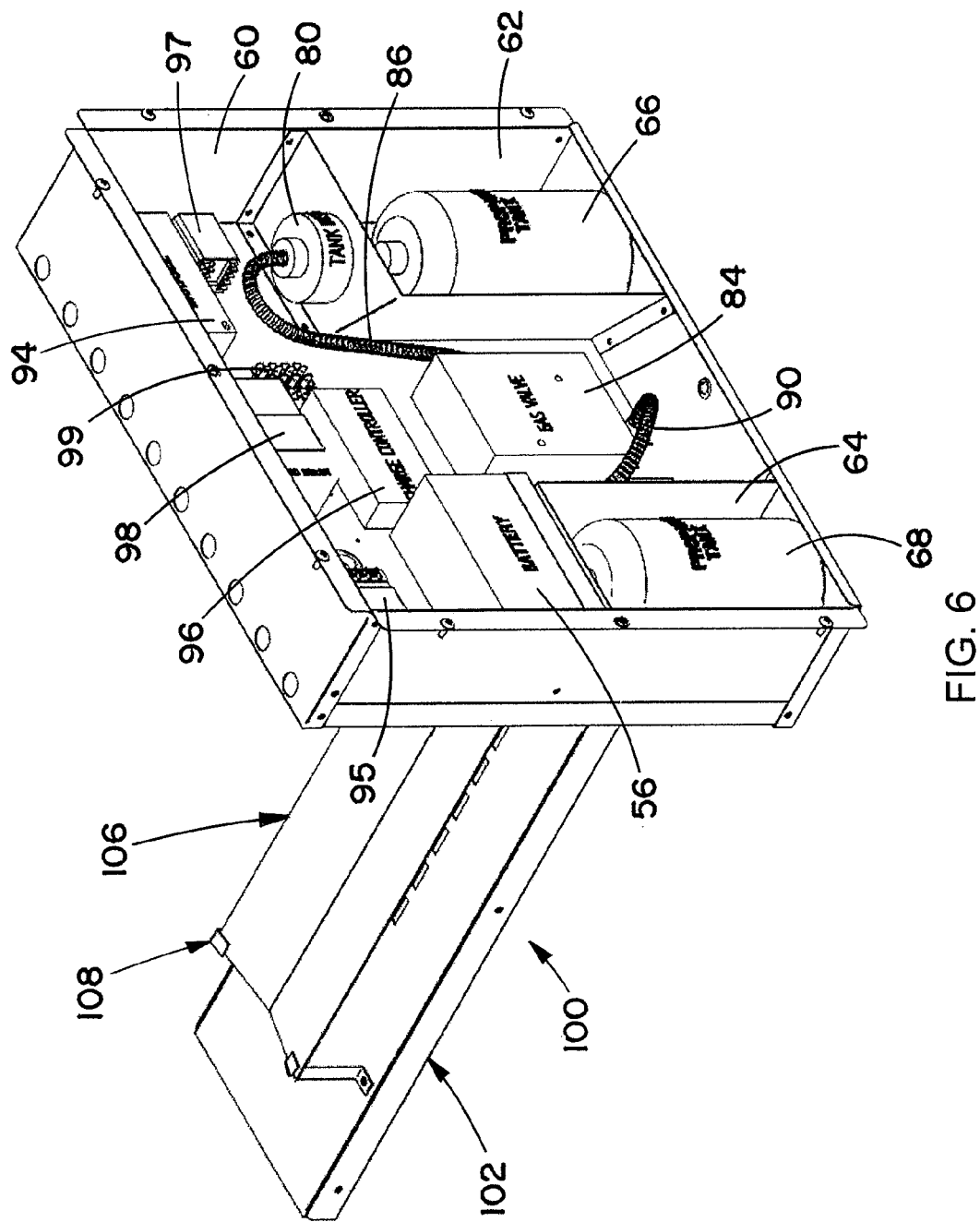
FIG. 6 is a perspective view of a back portion and burner assembly of the indoor/outdoor cabinet.
Figure 10:
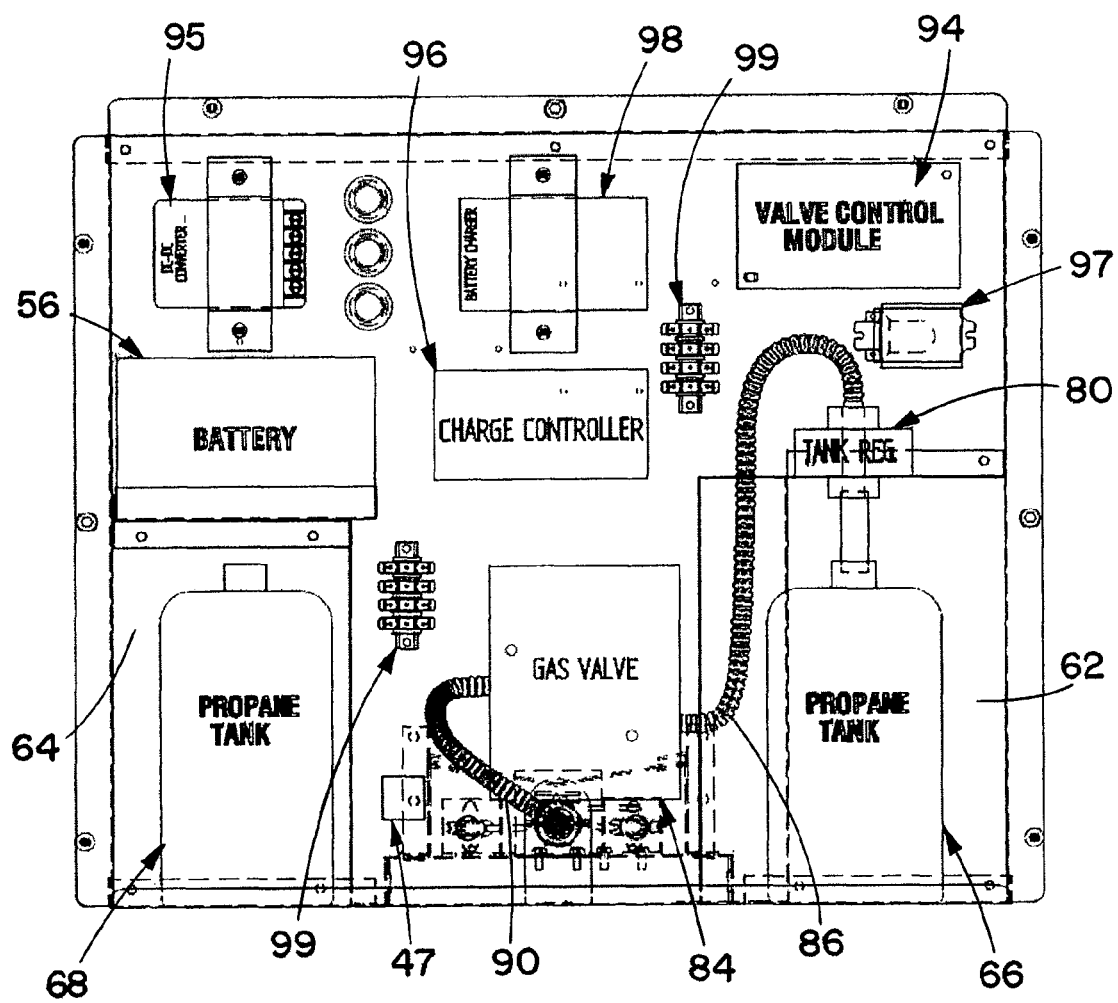
FIG. 10 is a front view of the back portion of the burner assembly of FIG. 6.

Referring now to FIGS. 6 and 10 in detail, the lower recessed area 60 is shown with the plate 70 removed. The lower recessed area includes a back wall 76 that separates the recessed area 60 from the cavity 18, and which includes an opening 78 (FIG. 7) providing access to the cavity 18. The storage well 62 includes an opening through which the tank 66 can be coupled to a regulator 80 used to control the flow of gas from the tank. In the illustrated embodiment, the tank 66 is coupled to the regulator 80 by a threaded connection, although other suitable connections may be used. Although not shown being coupled to a regulator, it will be appreciated that the tank 68 may also be coupled to a regulator similarly to tank 66. It will also be appreciated that if the cabinet is being used with natural gas, for example, the regulator may be replaced by a natural gas connector and an orifice in the gas valve can be changed.

The regulator 80 can be coupled to the storage well 62 by any suitable means or may not be coupled to the well 62 at all. The regulator 80 is also coupled to the gas control valve 84 via a hose 86. The control valve may be any suitable control valve configured to control the flow of gas. The control valve is connected to a burner tube 88 (FIG. 8) by a hose 90 that passes into the cavity 18 through the opening 78 and to the valve control module 94 provided to control the valve 84. For example, when the thermostat 44 is adjusted, the adjustment is communicated to the control module 94, which communicates with the control valve 84 to adjust the flow of gas to the burner tube 88 to adjust the temperature in the cavity 18.

The lower recessed area 60 also includes a charge controller 96 and a charger 98. When the battery requires charging, if solar energy is available, the charge controller 96 opens a circuit allowing the battery charger 98, coupled to the solar panel 50 and the batter 56, to charge the battery. If solar energy is unavailable or if the cabinet does not include a solar panel, the charge controller allows the battery to be charged when the cabinet is plugged into a wall outlet or generator. Also included is a converter 95, such as a DC-DC converter to convert power from a higher volt system to a lower volt control module, and any suitable number of relays 97 and terminal blocks 99 used for any suitable purposes, such as for switching between charging modes, power sources, etc. and for providing connections between components.

Figure 7:
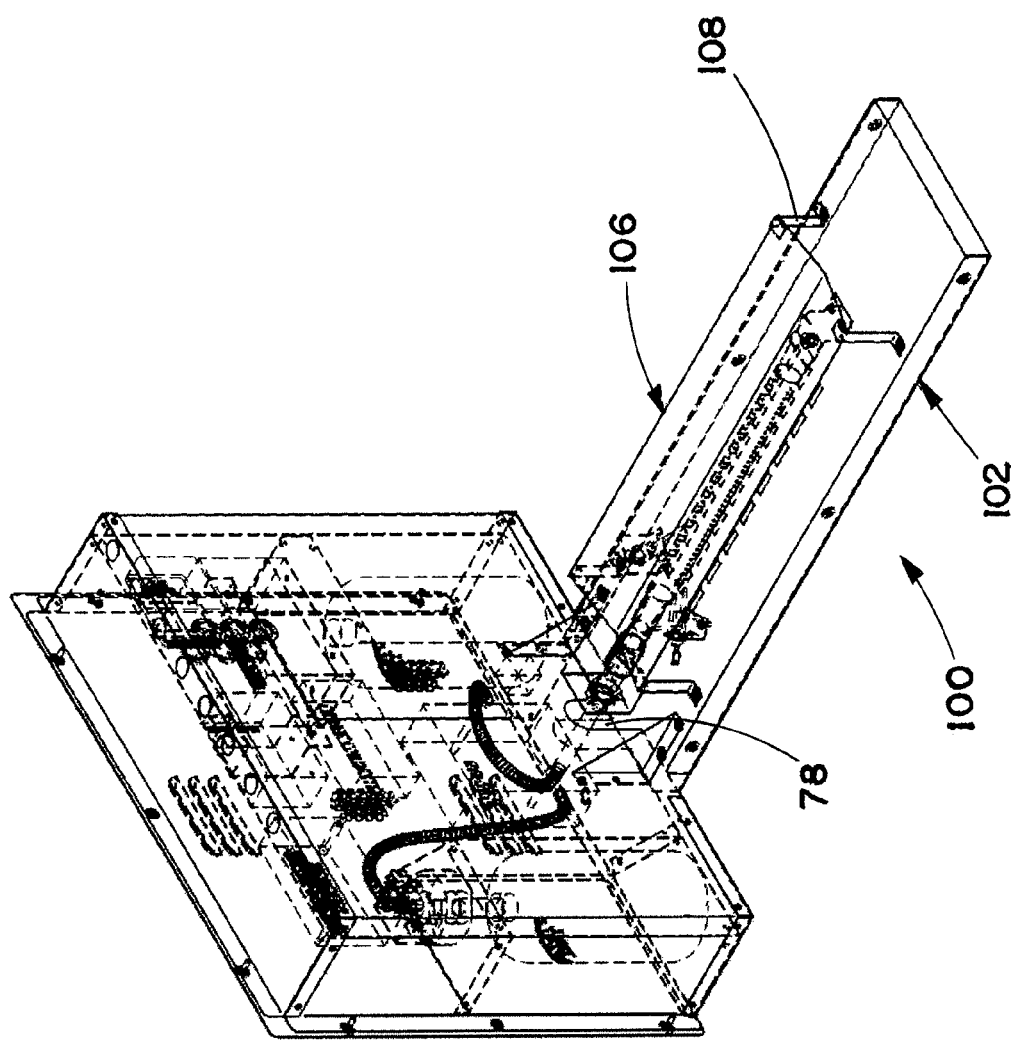
FIG. 7 is another perspective view of the back portion and burner assembly of the indoor/outdoor cabinet.
Figure 8:
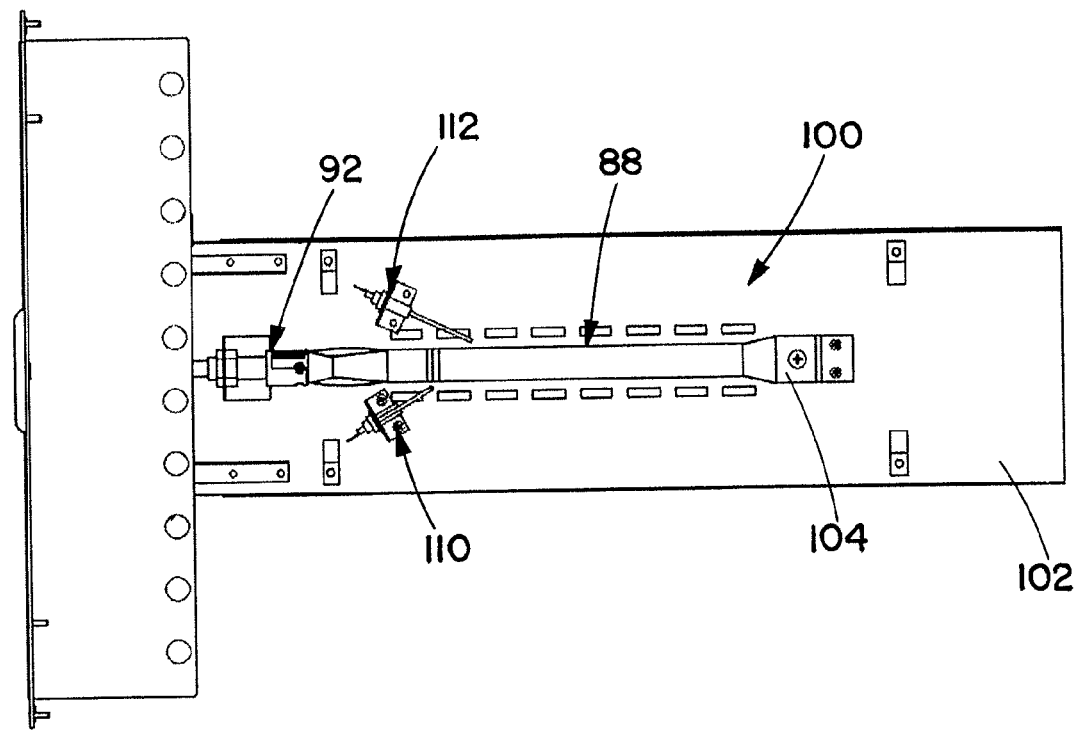
FIG. 8 is a top view of the back portion and burner assembly of FIGS. 6 and 7 with a cover removed.
Figure 9:
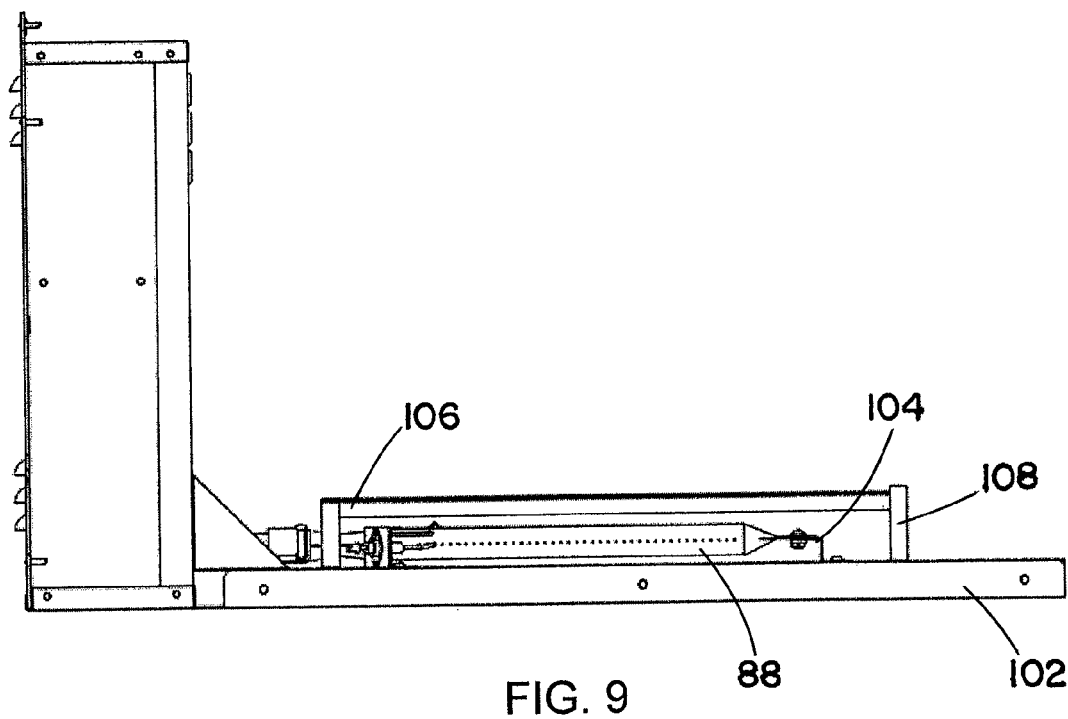
FIG. 9 is a side view of the back portion and burner assembly of FIGS. 6 and 7.

Turning now to FIGS. 7-9, a burner assembly 100 located in the bottom of the cavity 18 is illustrated. The burner assembly includes the burner tube 88 that includes an orifice 92 for drawing in air and a plate 102 provided to support the burner tube 88. At least one bracket 104 is provided, such as an L-bracket, for supporting an end of the burner tube 88 to elevate the burner tube from the plate. The bracket can be coupled to the plate 102 by suitable fasteners. The burner assembly 100 also includes a deflector 106 having a plurality of legs 108 coupled to the plate by any suitable means. The deflector 106 allows the heat from the burner tube 88 to be dispersed evenly in the cabinet and protects the burner assembly 100.

The burner assembly 100 also includes an igniter 110 and a sensor 112. To heat the cavity 18 with the gas power source, the burner tube 88 may be ignited by pushing the ignition button 46, which is coupled to the igniter 110 by suitable wires that access the cavity 18 through the opening 78. Upon ignition, the temperature in the cavity 18 can be adjusted by adjusting the thermostat 44 as discussed above. The sensor 112, which may be for example a thermocouple, is provided to communicate to the gas valve control module 98 whether or not the flame is lit. If the flame is lit, the sensor 112 communicates with the control module to stop the igniter 110, and when the flame is out, the sensor communicates with the control module 98 to automatically reignite the flame. If the flame is accidently extinguished, the sensor communicates with the control module to cut off the gas supply. If the gas in tank 66 runs out, the tank can be removed, tank 68 can be coupled to the regulator 80, and the burner 88 can be reignited to continue heating the cavity 18.

Figure 11:
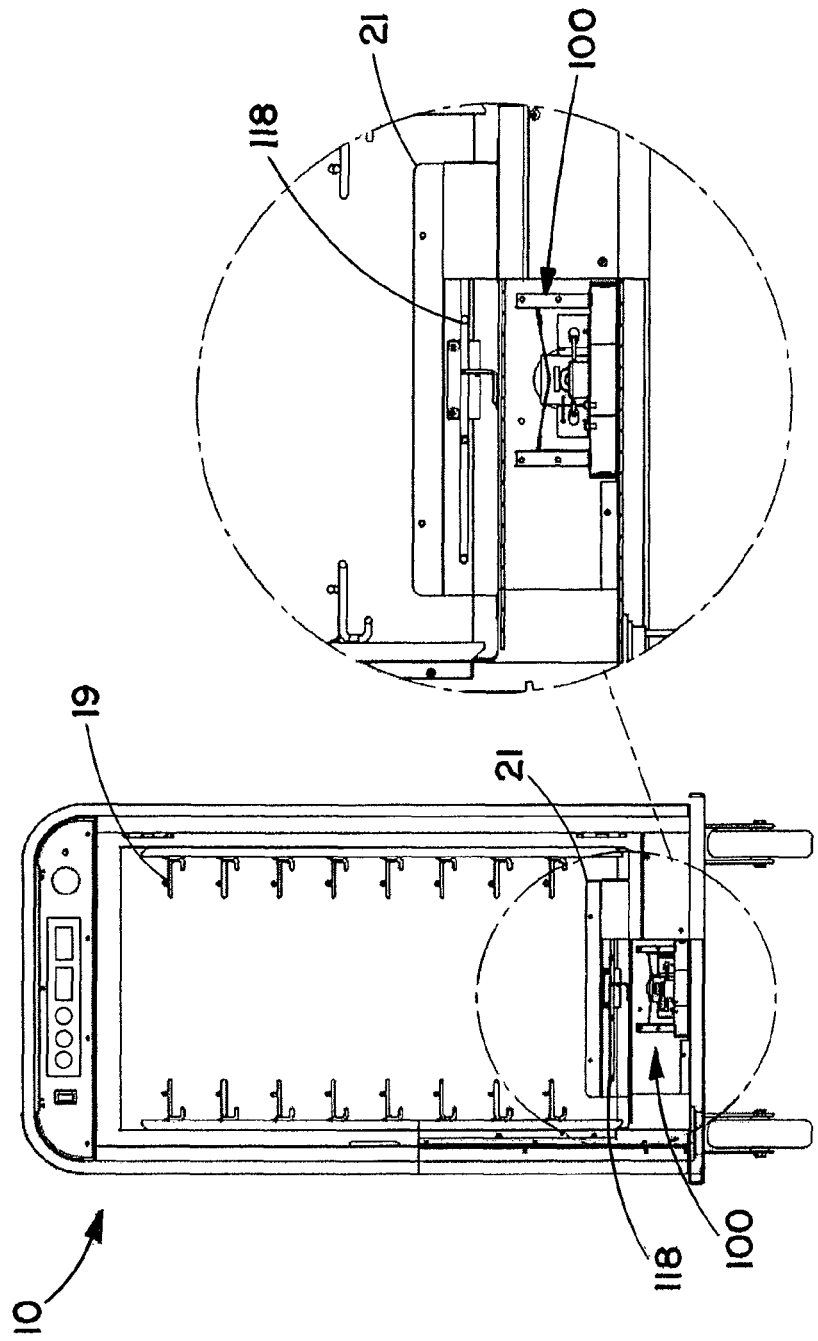
FIG. 11 is another front view of the indoor/outdoor cabinet with the door removed.
Figure 12:
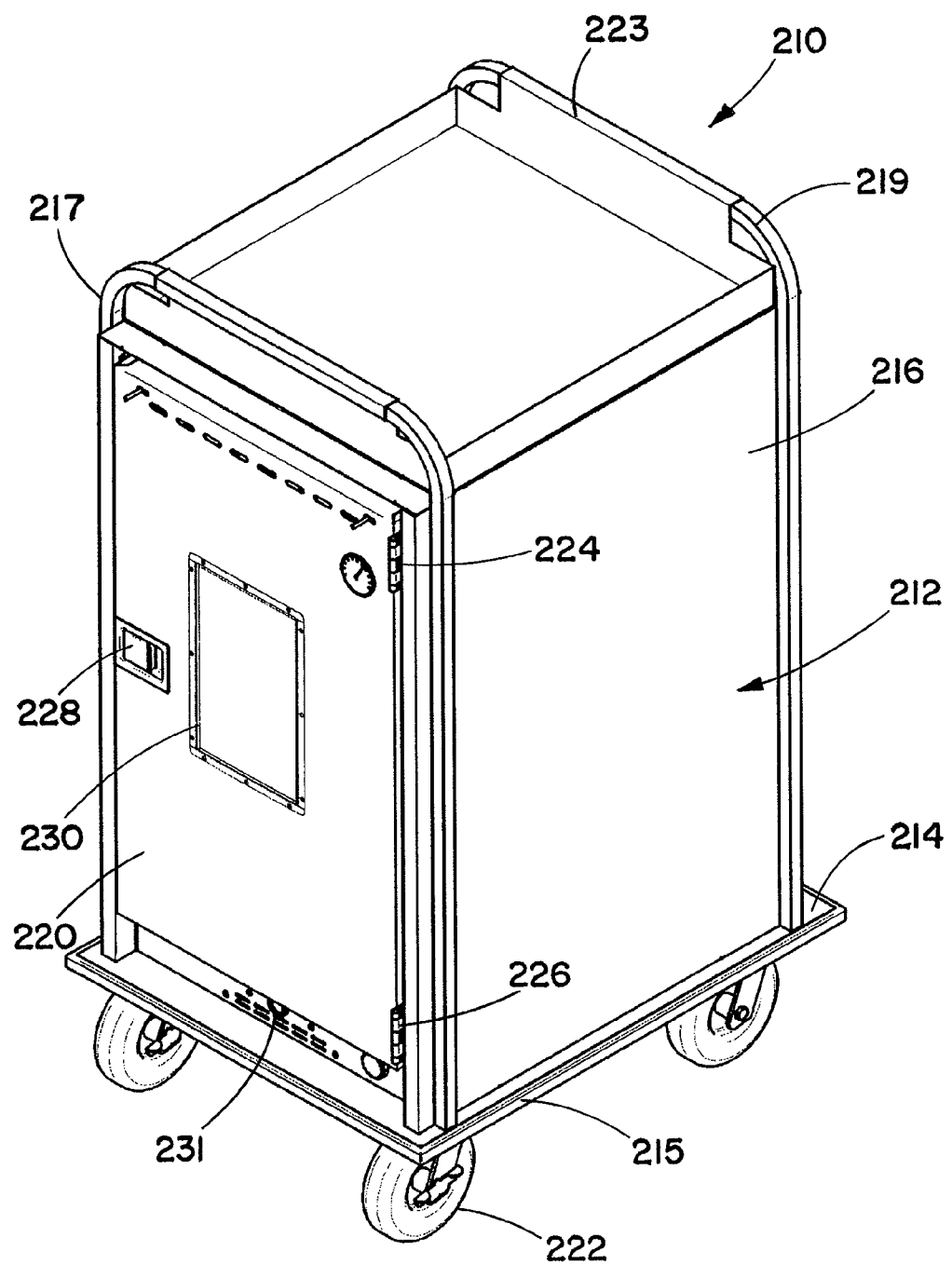
FIG. 12 is a perspective view of an exemplary outdoor hot cabinet.
Figure 14:
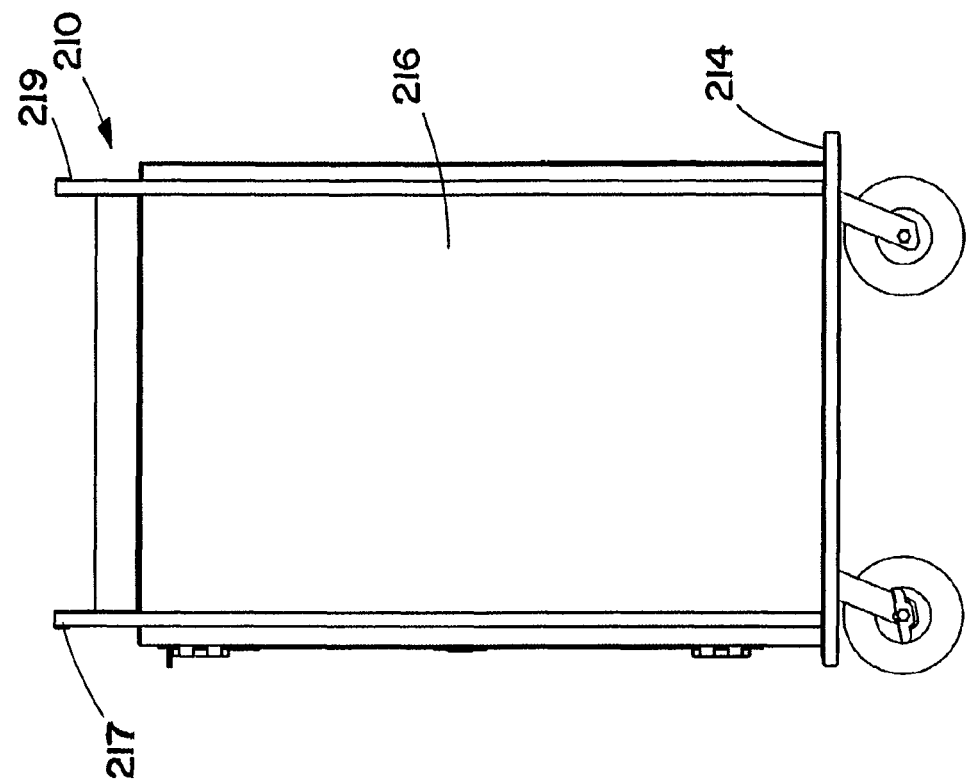
FIG. 14 is a right side view of the outdoor cabinet.

Turning now to FIG. 11, to heat the cavity 18 with the electrical power source, the cabinet includes an electric heating element 118, which may be any suitable electric heating element, coupled to the electrical power source by electrical cord 116 (FIG. 4) by any suitable means. The electric heating element 118 is disposed in the bottom of the cavity 18 below the heater cover 21. The electrical cord may be plugged into an electrical outlet or a gas generator, for example, and may a fixed to the cabinet, removably connected to the cabinet, and/or retractable and storable in the cabinet. When the on/off switch 40 is turned on and the heat source switch 42 is switched to electricity, the electric heating element heats up the cavity 18 to the desired temperature. The cabinet, for example, could be connected to an electrical power source while indoors to heat the cavity 18, and then when being transported, the heat source switch 42 could be switched to gas, the burner ignited, and the cabinet temperature maintained.

Turning now to FIGS. 12-22, an exemplary outdoor cabinet is shown at 210. The outdoor hot cabinet 210 can be powered by gas, such as propane, natural gas, etc., thereby providing a portable cabinet for use outdoors. The cabinets heating system may be capable of heating up to any desired temperature, such as 200° F.

The cabinet includes a housing 212 formed by a base 214 and a body 216, which may be composed of one or more parts. The housing may be reinforced by a frame, such as an internal stainless steel frame, and may be made of any suitable material, such as aluminum. The housing may include a perimeter bumper 215, which may be formed around the base for example, that helps prevent damage to the cabinet when it comes in contact with walls, doorframes, etc. One or more handles, for example front and back handles 217 and 219 may be provided at a top portion of the housing for a user to hold onto to push/pull the cabinet. A removable task surface 223 may be coupled to the handles 217 and 219 in any suitable manner, for example by u-shaped portions on arms of the handles that hang on the handles. The task surface may be used in any suitable manner, for example for storage. The housing 212 defines a cavity 218 (FIG. 16) that is accessible by a door 220 that closes an opening in the front of the housing 212. The housing and the door 220 may be insulated to prevent temperature loss during use. For example, the housing may include fiberglass insulation and the door may include a gasket such as a magnetic santoprene.

The door is coupled to the housing 212 by any suitable means, such as by hinges 224 and 226. The door includes a handle 228 configured to latch to the housing by a suitable latch, such as a magnetic latch. In the illustrated embodiment the door is shown having the hinges attached to the right side but it will be appreciated that the door may be field reversible allowing the door to be hinged on the left side. The handle 228 can be equipped with a key lock or other suitable lock to lock the cabinet, for example during transportation. The door 220 may also include a viewing window 230, which may be made of any suitable material, such as glass, acrylic glass, etc. The cabinet may also include a sight panel 231 provided below the door to allow a user to view a burner assembly, discussed below, during use of the cabinet.

Attached to housing 212, for example at a bottom side of the base 214, is a plurality of wheels 222, such as pneumatic swivel casters, that allow the cabinet to be moved easily, even when fully loaded and when tough outdoor conditions are experienced. A brake may be provided on one or more of the casters so that the cabinet can be locked in place when being used.

Figure 16:
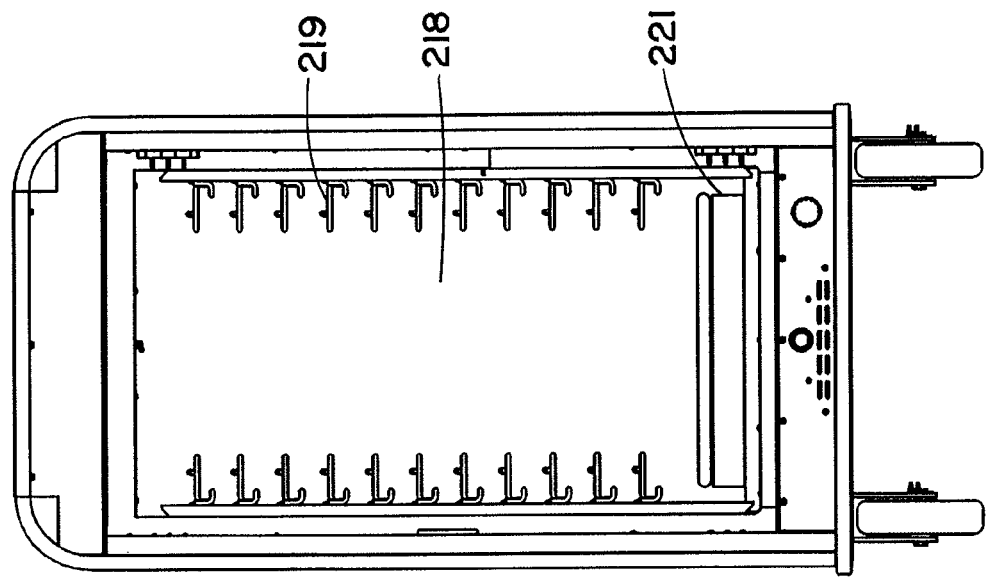
FIG. 16 is a front view of the outdoor cabinet with a door removed.

As shown in FIG. 16, the cabinet may also include one or more angles 219 provided in the cavity 218 for supporting one or more shelves and/or trays during transportation and use of the cabinet. The angles 219 can be adjusted so that the shelves and/or trays can be configured in any suitable manner. The angles 219 and shelves/trays are removable to allow the cavity to be cleaned. The angles 219 may be chrome plated wire universal angles that are mounted on lift-off pots and that allow for a large variety of pan sizes to be accommodated in the cavity. The cavity 218 also includes smooth interior coved corners to prevent food particle and grease buildup. Also provided in the cavity is heater cover 221 provided to promote clean ability in the cavity.

Figure 13:
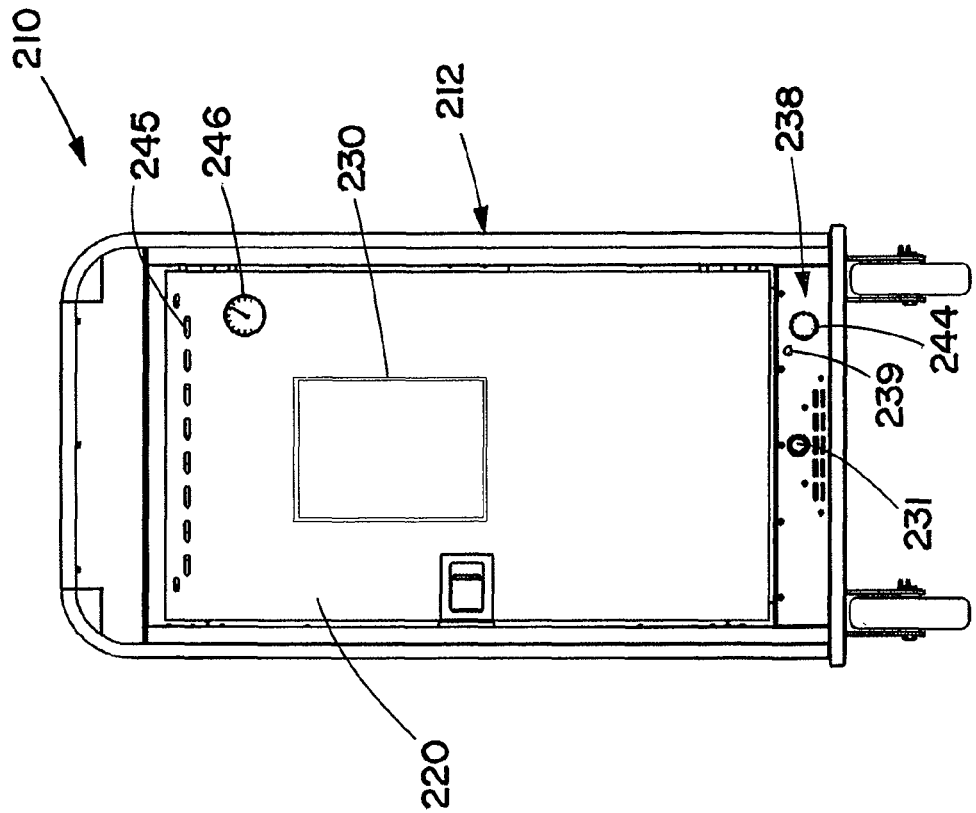
FIG. 13 is a front view of the outdoor cabinet.

Turning now to FIG. 13, a control device 238 is provided at a bottom portion of the cabinet adjacent the sight panel 231. The control device 238 includes by an indicator light 239 and/or audible alarm to indicate that the burner is on/off. The control device 238 also includes a temperature control device 244, such as a burner knob 244 that adjusts the temperature in the cavity of the cabinet along with louvers 245 at a top portion of the door 220, and ignites the burner. The burner knob may be adjustable to various temperatures or to various settings such as low, medium and high. A first action of the burner knob, such as pushing in and/or turning the burner knob, may serve to ignite the burner, and a second action of the knob, such as turning the knob clockwise/counter-clockwise, may serve to adjust the temperature setting. A temperature display 246 may also be provided an any suitable location, for example at an upper portion of the door 220, to display the temperature in the cavity 218. The temperature display may be coupled to any suitable device in the cavity for determining temperature, such as a thermometer.

Figure 15:
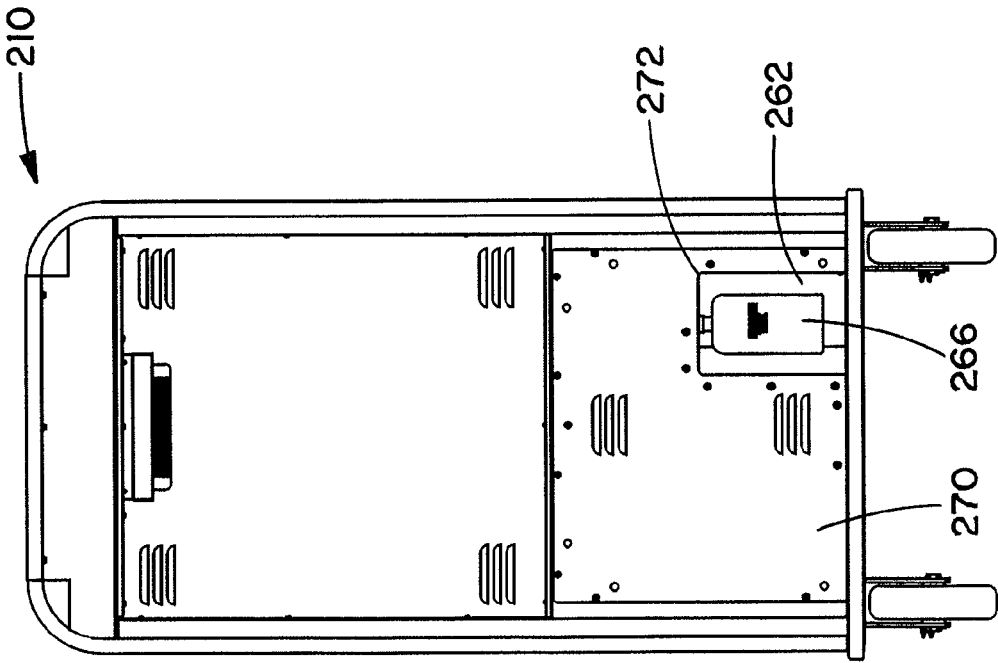
FIG. 15 is a rear view of the outdoor cabinet.

Turning now to FIG. 15, the back of the cabinet is shown in detail. The back of the cabinet includes a lower recessed area 260 (FIG. 17) that has a storage well 262 for storing a tank, such a gas tank 266 of any suitable size, such as a one pound gas tank for powering the cabinet. The recessed area 260 may be closed by a plate 270 that may be secured to the housing by a suitable fastener. The plate 270 may be removed to allow access to the recessed area and specifically to the gas tank 266. In the illustrated embodiment, the plate 270 includes an opening 272 that allows access to the tank 266 so the tank can be inserted into the recessed area 260 and opened/closed without having to remove the plate 270. The opening 272 also provides access for an auxiliary hose to be connected to the cabinet so that an externally located gas tank, such as a tank that is larger in size than tank 266, can be used to provide power for a longer duration than tank 266 can provide.

Figure 17:
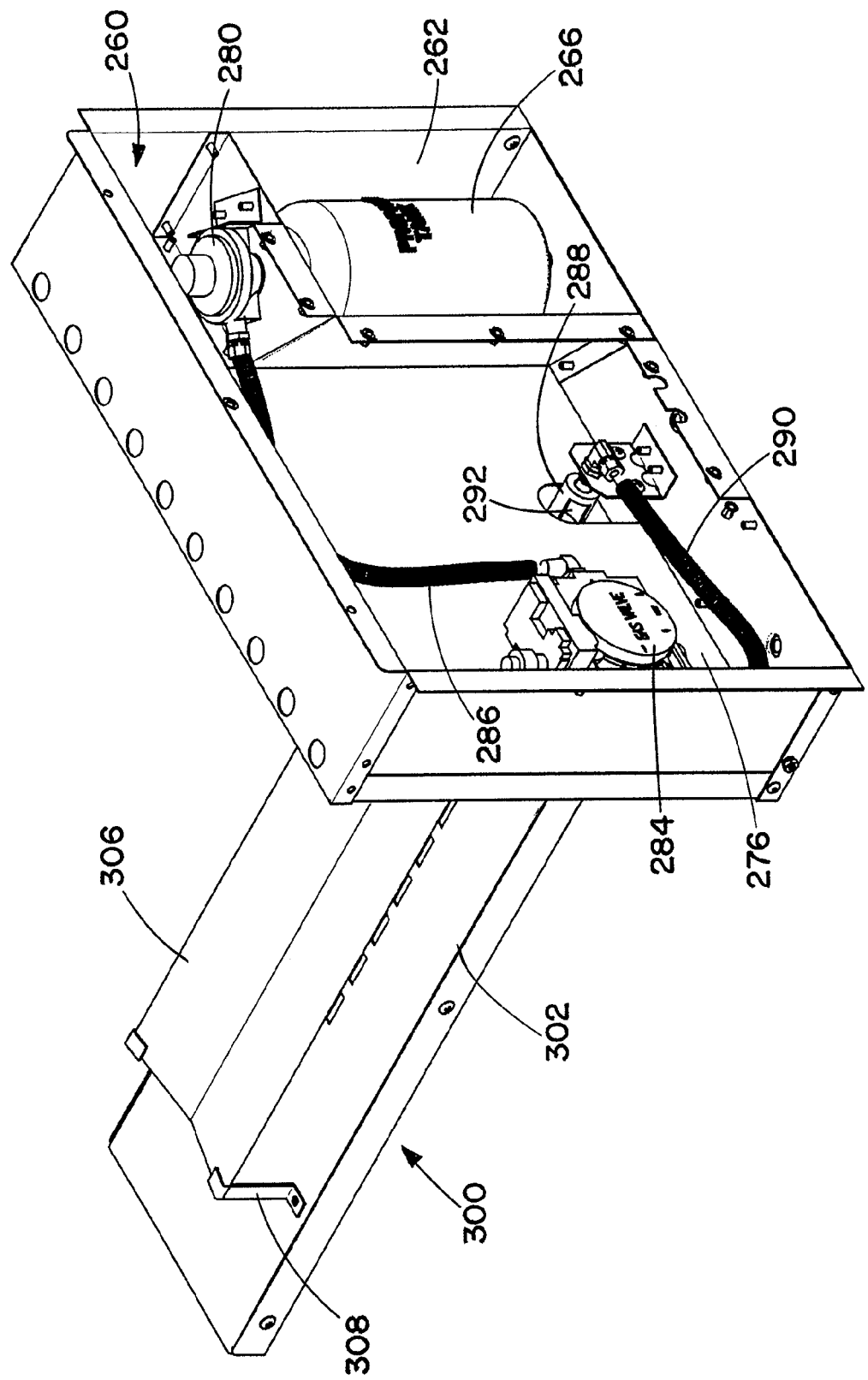
FIG. 17 is a perspective view of a back portion and burner assembly of the outdoor cabinet.
Figure 21:
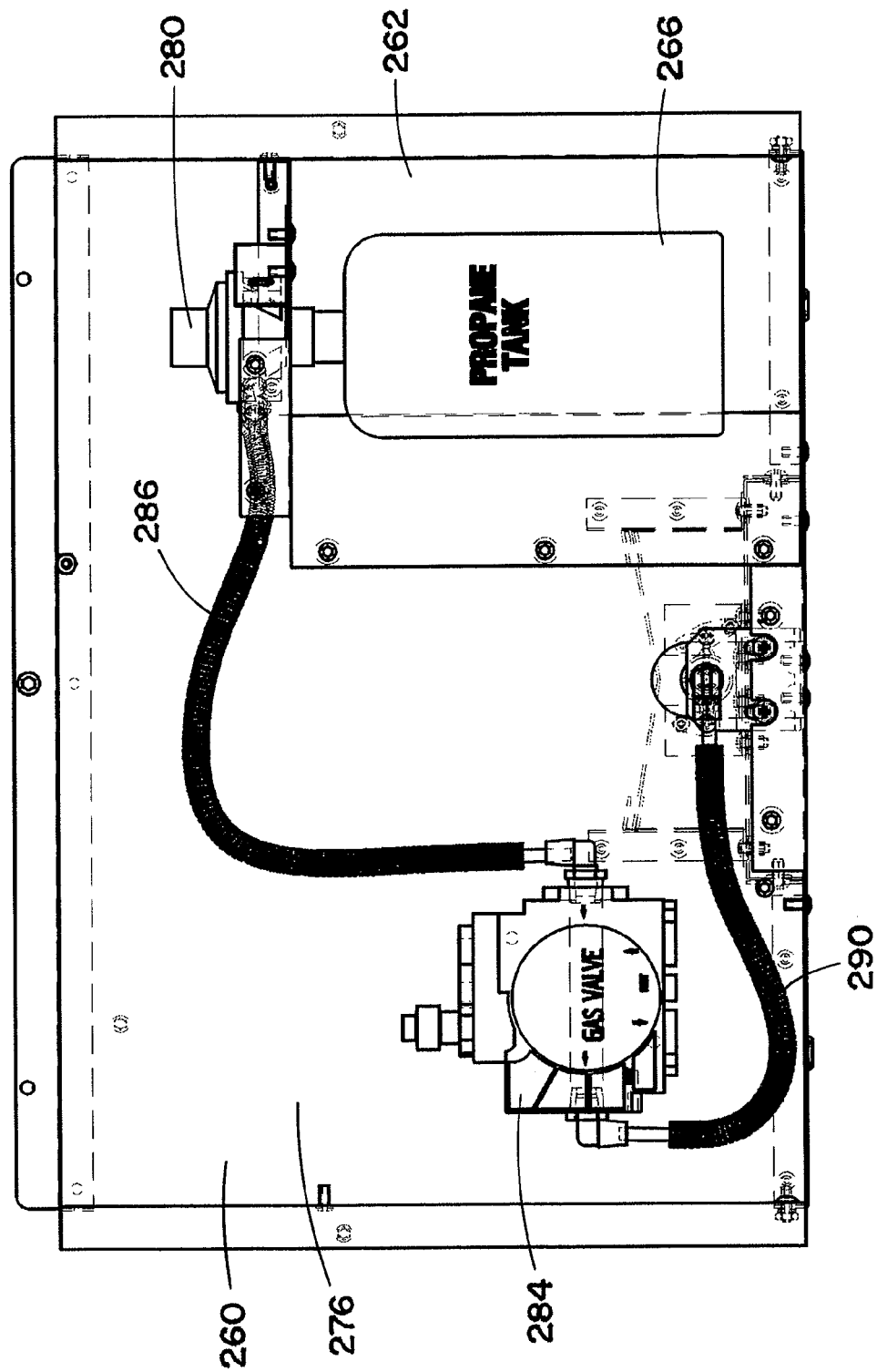
FIG. 21 is a front view of the back portion of the burner assembly of FIG. 17.
Figure 22:
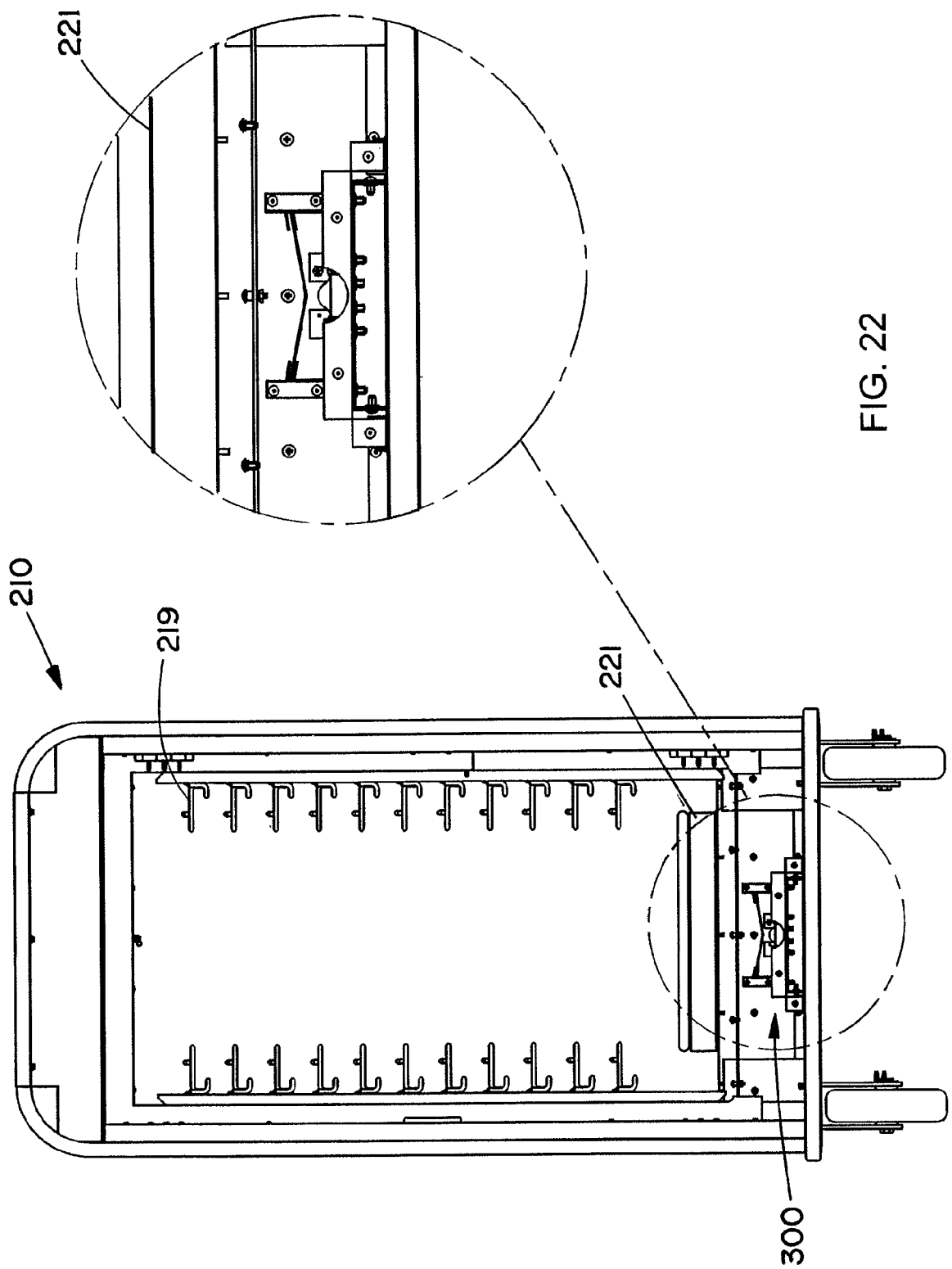
FIG. 22 is another front view of the outdoor cabinet with the door removed.

Referring now to FIGS. 17 and 21 in detail, the lower recessed area 260 is shown with the plate 270 removed. The lower recessed area includes a back wall 276 that separates the recessed area 260 from the cavity 218, and which includes an opening 278 (FIG. 18) providing access to the cavity 218. The storage well 262 includes an opening through which the tank 266 can be coupled to a regulator 280 used to control the flow of gas from the tank. In the illustrated embodiment, the tank 266 is coupled to the regulator 280 by a threaded connection, although other suitable connections may be used. It will be appreciated that if the cabinet is being used with natural gas, for example, the regulator may be replaced by a natural gas connector and an orifice in the gas valve can be changed.

The regulator 280 can be coupled to the storage well 262 by any suitable means or may not be coupled to the well 262 at all. The regulator 280 is also coupled to the gas valve 284 via a hose 286. The gas valve may be any suitable gas valve configured to control the flow of gas. The gas valve is connected to a burner tube 288 by a hose 290 that passes into the cavity 218 through the opening 278. For example, when the burner knob 244 is adjusted, the adjustment is communicated directly to the gas valve, which in turn adjusts the flow of gas to the burner tube 288 to adjust the temperatures (in conjunction with louvers 245) in the cavity 218.

Figure 18:
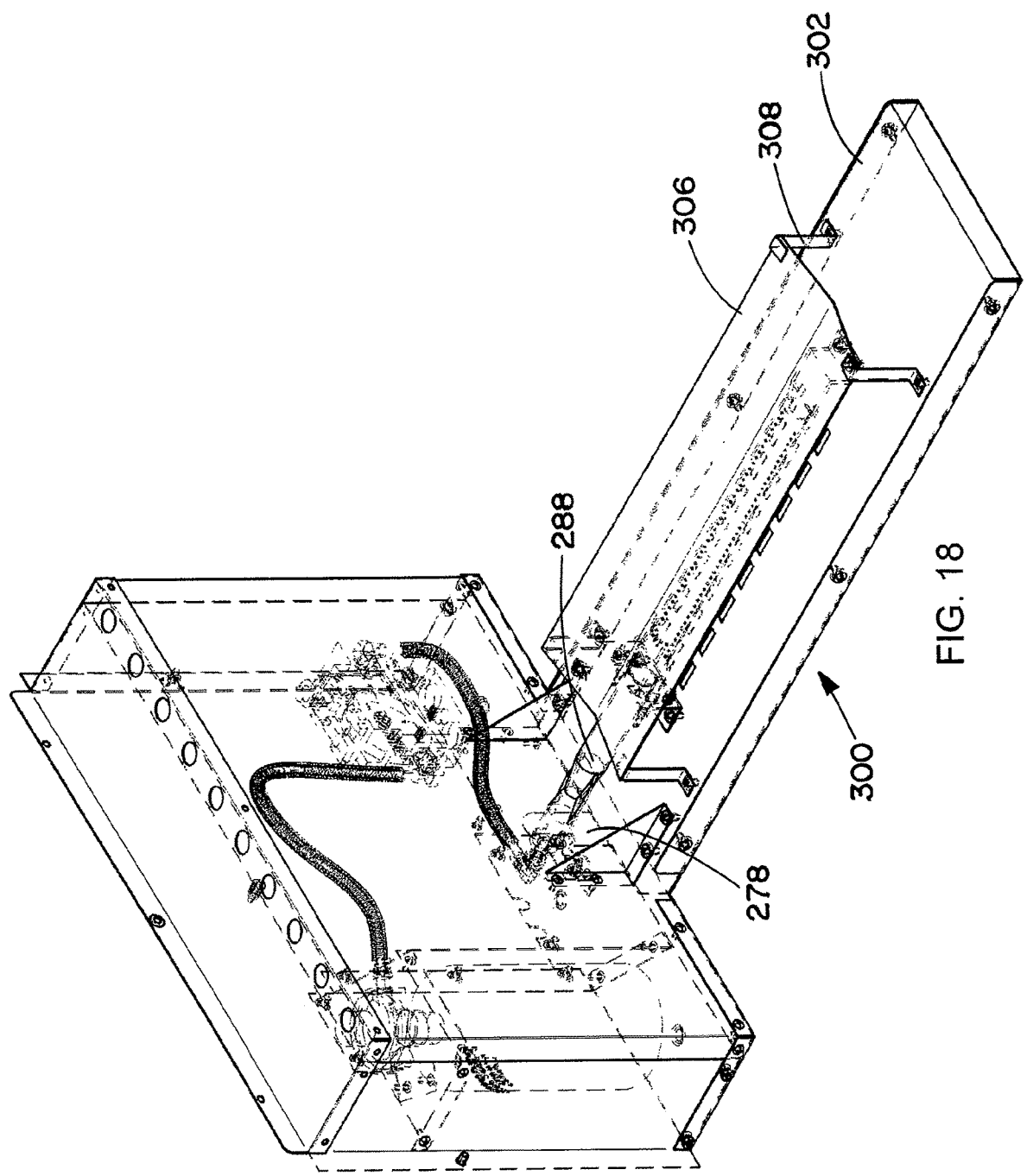
FIG. 18 is another perspective view of the back portion and burner assembly of the outdoor cabinet.
Figure 19:
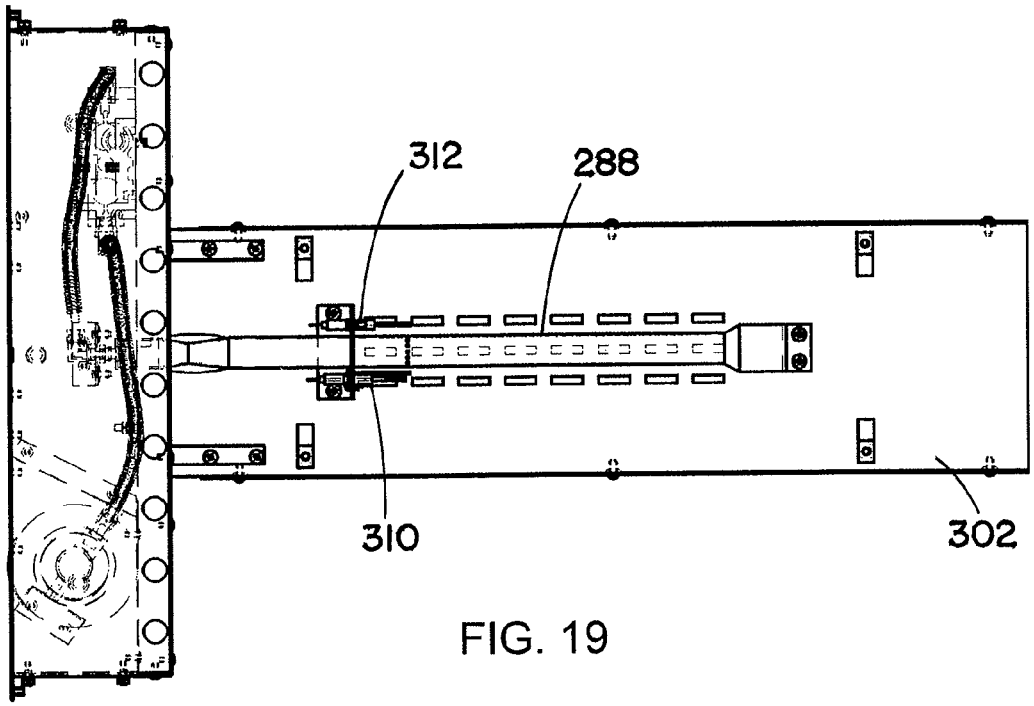
FIG. 19 is a top view of the back portion and burner assembly of FIGS. 17 and 18 with a cover removed.
Figure 20:
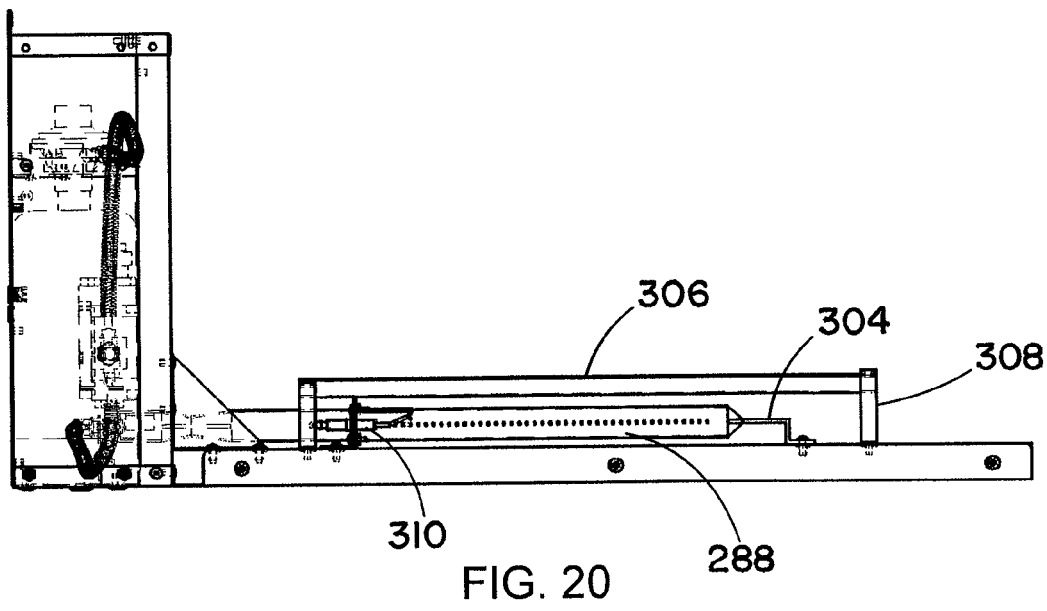
FIG. 20 is a side view of the back portion and burner assembly of FIGS. 17 and 18.

Turning now to FIGS. 18-20, a burner assembly 300 located in the bottom of the cavity 218 is illustrated. The burner assembly includes the burner tube 288 that includes an orifice 292 for drawing in air and a plate 302 provided to support the burner tube 288. At least one bracket 304 is provided, such as an L-bracket, for supporting an end of the burner tube 288 to elevate the burner tube from the plate. The bracket can be coupled to the plate 302 by suitable fasteners. The burner assembly 300 also includes a deflector 306 having a plurality of legs 308 coupled to the plate by any suitable means. The deflector 306 allows the heat from the burner tube 288 to be dispersed evenly in the cabinet and protects the burner assembly 300.

The burner assembly 300 also includes an igniter 310 and a sensor 312. To heat the cavity 218 with the gas power source, the burner tube 288 may be ignited by pushing and/or turning the burner knob 244, which is coupled to the igniter 310 by suitable wires that access the cavity 218 through the opening 278. Upon ignition, the temperature in the cavity 218 can be adjusted by adjusting the burner knob 244 and by the louvers as discussed above. The sensor 312, which may be for example a thermocouple, is provided to communicate to the gas valve 284 whether or not the flame is lit. If the flame is lit, the sensor 312 communicates with the gas valve to stop the igniter 310, and when the flame is out, the sensor communicates with the gas valve to stop the flow of gas and to begin the sequence to alert the user that the flame has extinguished. For example, a visual alarm and/or audible alarm may be provided to notify the operator that the flame has been extinguished.

It will be appreciated upon reading and understanding the specification that aspects of the cabinets 10 and 210 may be substituted for one another or used in conjunction with one another where applicable. For example, the ignition button 46 of the cabinet 10 may be replaced by the burner knob 244 of cabinet 210.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable indoor/outdoor warming cabinet operable by electricity or gas contained in a gas tank, the cabinet including:
   a portable housing having a plurality of wheels for enabling transportation of the portable indoor/outdoor warming cabinet between an indoor location and an outdoor location, the portable housing having insulated walls that define an internal cavity, and the portable housing having an opening at a front side thereof;
   laterally spaced apart pairs of supports within the internal cavity for supporting shelves and/or trays, wherein the laterally spaced apart pairs of supports are arranged vertically spaced apart from each other in the internal cavity;
   an insulated door coupled to the portable housing for closing the opening and for allowing access to the internal cavity;
   a burner assembly at least partially disposed in the internal cavity, the burner assembly configured to be powered by the gas in the gas tank to heat the internal cavity when in use; an electrical heating element at least partially disposed in the internal cavity, the electrical heating element configured to be powered by electricity to heat the internal cavity when in use; and
   a control panel having a heat source switch coupled to the burner assembly and the electrical heating element, the heat source switch being configured to select the burner assembly or the electrical heating element for heating the internal cavity when in use;
   wherein the portable housing includes a storage area separated from the internal cavity by a partition, the storage area having a gas conduit that is fluidly connected to the burner assembly, the gas conduit being fluidly connected to a gas regulator and having a connector configured for connection to the gas tank,
   wherein the storage area is a recessed area in the portable housing, the recessed area having a storage well adapted for storing and carrying the gas tank.

2. The portable indoor/outdoor cabinet according to claim 1, wherein the gas conduit is fluidly connected to a gas control valve for controlling a supply of the gas to the burner assembly.

3. The portable indoor/outdoor cabinet according to claim 2, wherein the control panel includes an adjuster for adjusting a flame of the burner assembly.

4. The portable indoor/outdoor cabinet according to claim 3, wherein the burner assembly includes a burner and an igniter coupled to the adjuster, wherein the burner is ignitable by a first action of the adjuster and the flame is adjustable by a second action of the adjuster.

5. The portable indoor/outdoor cabinet according to claim 4, wherein the adjuster is a thermostat or a burner knob.

6. The portable indoor/outdoor cabinet according to claim 4, further comprising a sensor coupled to the gas valve, the sensor configured to determine if the flame of the burner has been extinguished and to send a signal to the gas valve to shut off the supply of gas if the flame has been extinguished.

7. The portable indoor/outdoor warming cabinet according to claim 1, wherein the electrical heating assembly is separated from the burner assembly in the internal cavity by a separator.

8. The portable indoor/outdoor warming cabinet according to claim 1, wherein the gas conduit is connected to the burner assembly at one end thereof, and the connector for connection to the gas tank is at an opposite end thereof; and wherein the partition separates the gas tank from the burner assembly, and includes an opening through which the gas conduit extends.

9. The portable indoor/outdoor cabinet according to claim 1 in combination with the gas tank, the gas tank being a one pound gas tank.

10. The portable indoor/outdoor cabinet according to claim 1, wherein the storage area is on a different side of the housing than the door.

11. The portable indoor/outdoor warming cabinet according to claim 1, wherein the storage well for storing the gas tank is located on a back side of the portable housing which is opposite the front side of the portable housing having the insulated door.

12. The portable indoor/outdoor warming cabinet according to claim 1, wherein the heat source switch is configured to select between one of the burner assembly and the electrical heating element for heating the internal cavity when in use.

13. The portable indoor/outdoor warming cabinet according to claim 1, wherein the cabinet includes a temperature display for displaying a temperature of the internal cavity.

14. The portable indoor/outdoor warming cabinet according to claim 1, wherein the control panel includes an indicator light and/or an audible alarm configured to indicate whether one of the burner assembly or electrical heating element are activated.

15. The portable indoor/outdoor warming cabinet according to claim 1, further comprising a battery and a solar panel electrically coupled to the battery, wherein the solar panel is configured to power the control panel and/or charge the battery.

16. The portable indoor/outdoor warming cabinet according to claim 14, wherein the storage area includes a charge controller and a charger; wherein the charge controller is configured such that, when the battery requires charging (i) if solar energy is available, the charge controller opens a circuit allowing the battery charger, coupled to the solar panel and the battery, to charge the battery; and (ii) if solar energy is unavailable, the charge controller allows the battery to be charged when the cabinet is plugged into a wall outlet or generator.

17. The portable indoor/outdoor warming cabinet according to claim 1, wherein the laterally spaced apart pairs of supports are removable and vertically adjustable.

18. The portable indoor/outdoor warming cabinet according to claim 1, wherein the internal cavity includes smooth interior coved corners.

19. The portable indoor/outdoor warming cabinet according to claim 1, wherein the wheels are swivel casters, and wherein at least one of the wheels includes a brake.

\* \* \* \* \*

UNITED STATES PATENT AND TRADEMARK OFFICE
CERTIFICATE OF CORRECTION

| | | |
|---|---|---|
| PATENT NO. | : 10,856,694 B1 | Page 1 of 1 |
| APPLICATION NO. | : 16/676854 | |
| DATED | : December 8, 2020 | |
| INVENTOR(S) | : Baggott et al. | |

It is certified that error appears in the above-identified patent and that said Letters Patent is hereby corrected as shown below:

On the Title Page

Item (12), reads, "Baggot et al." should read -- Baggott et al. --

Item (72), Inventors reads, "Cliff D. Baggot, Gates Mills, OH (US)" should read -- Cliff D. Baggott, Gates Mills, OH (US) --

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*